US012699980B2

(12) United States Patent
Martin

(10) Patent No.: US 12,699,980 B2
(45) Date of Patent: Aug. 4, 2026

(54) METHOD FOR MANAGING A TILL E-RECEIPT

(71) Applicant: THALES DIS FRANCE SAS, Meudon (FR)

(72) Inventor: Alain Martin, Saint Nom la Bretèche (FR)

(73) Assignee: THALES DIS FRANCE SAS, Meudon (FR)

( * ) Notice: Subject to any disclaimer, the term of this patent is extended or adjusted under 35 U.S.C. 154(b) by 131 days.

(21) Appl. No.: 18/691,093

(22) PCT Filed: Sep. 12, 2022

(86) PCT No.: PCT/EP2022/075320
§ 371 (c)(1),
(2) Date: Mar. 12, 2024

(87) PCT Pub. No.: WO2023/036990
PCT Pub. Date: Mar. 16, 2023

(65) Prior Publication Data
US 2024/0403854 A1      Dec. 5, 2024

(30) Foreign Application Priority Data

Sep. 13, 2021    (EP) ..................................... 21306250

(51) Int. Cl.
*G06Q 20/00* (2012.01)
*G06Q 20/20* (2012.01)
*G06Q 20/34* (2012.01)
*G06Q 20/40* (2012.01)

(52) U.S. Cl.
CPC ......... *G06Q 20/209* (2013.01); *G06Q 20/341* (2013.01); *G06Q 20/4012* (2013.01); *G06Q 20/40145* (2013.01)

(58) Field of Classification Search
CPC .............. G06Q 20/209; G06Q 20/341; G06Q 20/4012; G06Q 20/40145; G06Q 20/204; G06Q 30/04; G06Q 20/047; G06Q 20/3226
See application file for complete search history.

(56) References Cited

U.S. PATENT DOCUMENTS

| | | | |
|---|---|---|---|
| 2012/0203644 A1* | 8/2012 | Phillips | ............... G06Q 20/047 705/26.1 |
| 2016/0005132 A1 | 1/2016 | Freeman | |
| 2020/0104841 A1* | 4/2020 | Osborn | ............... G06Q 20/343 |

OTHER PUBLICATIONS

International Search Report (PCT/ISA/210) and Written Opinion (PCT/ISA/237) mailed on Dec. 13, 2022, by the European Patent Office as the International Searching Authority for current International Application No. PCT/EP2022/075320—[11 pages].

* cited by examiner

*Primary Examiner* — Rokib Masud

(57) ABSTRACT

Provided is a method for managing a till e-receipt during a payment transaction involving an Electronic Cash Register and a smart card. The method comprises the steps of: sending a URL from the Electronic Cash Register to the smart card, receiving by the Electronic Cash Register a card identifier which has been permanently allocated to the smart card, sending the card identifier and the till e-receipt from the Electronic Cash Register to a first server, and uniquely associating said card identifier and till e-receipt to the URL, such that the e-receipt can be subsequently retrieved by connecting to the URL. Other embodiments disclosed.

14 Claims, 3 Drawing Sheets

90

| | | |
|---|---|---|
| 91 | DATE1 | MERCHANT1 | URL1 |
| 92 | DATE2 | MERCHANT2 | URL2 |
| 93 | DATE3 | MERCHANT3 | URL3 |
| 94 | | | |

METHOD FOR MANAGING A TILL E-RECEIPT

FIELD OF THE INVENTION

The present invention relates to methods for managing a till e-receipt. It relates particularly to methods of managing a till e-receipt corresponding to a payment transaction in which a smart card is involved.

BACKGROUND OF THE INVENTION

Smart cards may be portable small devices comprising a memory, a processor unit and an operating system for computing treatments. They may comprise services applications like payment or telecom applications. Smart cards may include secure elements comprising a plurality of memories of different types, like non-volatile memory and volatile memory. They are considered as tamper-resistant (or "secure") because they are able to control the access to the data they contain and to authorize or not the use of data by other machines. A smartcard may also provide computation services based on cryptographic components. In general, physical smartcards have limited computing resources and limited memory resources and they are intended to connect a host machine which may provide them with electric power either in contact mode or contactless mode.

Smart cards may be digitalized in a host electronic device. For instance, a digital smart card (also called digital card) may be stored in a smartphone.

A banking smart card may participate to a payment transaction for providing a connected terminal with an authorization to conduct the transaction. For example, the applicative transaction may be a payment carried out via a Point-Of-Sale terminal. In order to save time and paper, the till receipt printing step can be skipped and a digital till receipt (also called till electronic-receipt or till e-receipt) may be generated and sent to the customer. This implies that the customer provides the merchant with personal information (such as email address or phone number for instance.)

Due to privacy concern, more and more customers do not want to provide merchants with their personal information.

There is a need to provide customers with access to their till e-receipts without requiring customers to provide merchants with the personal information they wish to keep confidential.

SUMMARY OF THE INVENTION

The invention aims at solving the above mentioned technical problem.

An object of the present invention is a method for managing a till e-receipt during a payment transaction involving an Electronic Cash Register and a smart card. The method comprises the steps of:

Sending a Uniform Resource Locator from the Electronic Cash Register to the smart card, Receiving by the Electronic Cash Register a card identifier which has been permanently allocated to the smart card, Sending the card identifier and the till e-receipt from the Electronic Cash Register to a first server, and Uniquely associating said card identifier and till e-receipt to the Uniform Resource Locator, such that the e-receipt can be subsequently retrieved by connecting to the Uniform Resource Locator.

Advantageously, the smart card may be a physical card and the card identifier may be a Primary Account Number. The smart card may be a digital card hosted in a terminal equipment and the card identifier may be a Token. The smart card may be either a physical card or a digital card hosted in a terminal equipment and the card identifier may be a Payment Account Reference.

Advantageously, the Electronic Cash Register may receive an expiry date permanently allocated to the smart card, and the Electronic Cash Register may send the expiry date to said first server.

Advantageously, the Electronic Cash Register may retrieve the Uniform Resource Locator from the first server before sending the Uniform Resource Locator to the smart card.

Advantageously, the Electronic Cash Register may send the Uniform Resource Locator to the smart card through a POS terminal and receive the card identifier from the POS terminal.

Advantageously, the Electronic Cash Register may receive a payment e-receipt from the POS terminal and send the payment e-receipt to the first server which may make the payment e-receipt accessible at said Uniform Resource Locator.

Advantageously, a terminal equipment may be provided with the Uniform Resource Locator, and retrieve the till e-receipt from the first server by using the Uniform Resource Locator.

Advantageously, the terminal equipment may be provided with the card identifier and send to the first server a request comprising the card identifier and the first server may allow the terminal equipment to access the till e-receipt only if the card identifier is associated to the used Uniform Resource Locator.

Advantageously, the terminal equipment may be provided with the card identifier, the first server may request a second server to authenticate a user of the terminal equipment and the terminal equipment may provide the till e-receipt to the terminal equipment only if the user has been successfully authenticated.

Another object of the present invention is an Electronic Cash Register able to participate to a payment transaction involving a smart card. The Electronic Cash Register is configured to send a Uniform Resource Locator to the smart card, the Electronic Cash Register is configured to receive a card identifier which has been permanently allocated to the smart card. The Electronic Cash Register is configured to send the card identifier and the till e-receipt to a first server in order to trigger the provision of the till e-receipt by the first server at the Uniform Resource Locator, said Uniform Resource Locator being uniquely allocated to the till e-receipt.

Advantageously, the Electronic Cash Register may be configured to request and get the Uniform Resource Locator from the first server at a first stage of the payment transaction.

Another object of the present invention is a system comprising an Electronic Cash Register according to the invention, a smart card and a POS terminal. The Electronic Cash Register may be configured to send the Uniform Resource Locator to the smart card through the POS terminal and to receive the card identifier from the POS terminal.

Advantageously, the system may comprise a terminal equipment configured to get an URL from the smart card, to retrieve the till e-receipt from the first server at the Uniform Resource Locator and to provide a user of the smart card with said till e-receipt.

Advantageously, said smart card may be a physical card or a digital card.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of smart card associated to a user (I.e. cardholder) and intended to contribute to a payment transaction. The smart card may be a physical bank smart card or a digital bank card for instance.

A till e-receipt is a document which comprises the list of goods and/or services bought by the customer. It can take the form of an invoice. Till receipts and till e-receipts are usually generated by an electronic cash register (ECR).

A till e-receipt is different from a payment e-receipt. A payment e-receipt is a document which comprises data allowing g to prove that a payment transaction has been successfully carried out. Payment receipts and payment e-receipts are usually generated by a Point-Of-Sale (POS) terminal.

Figure 1:
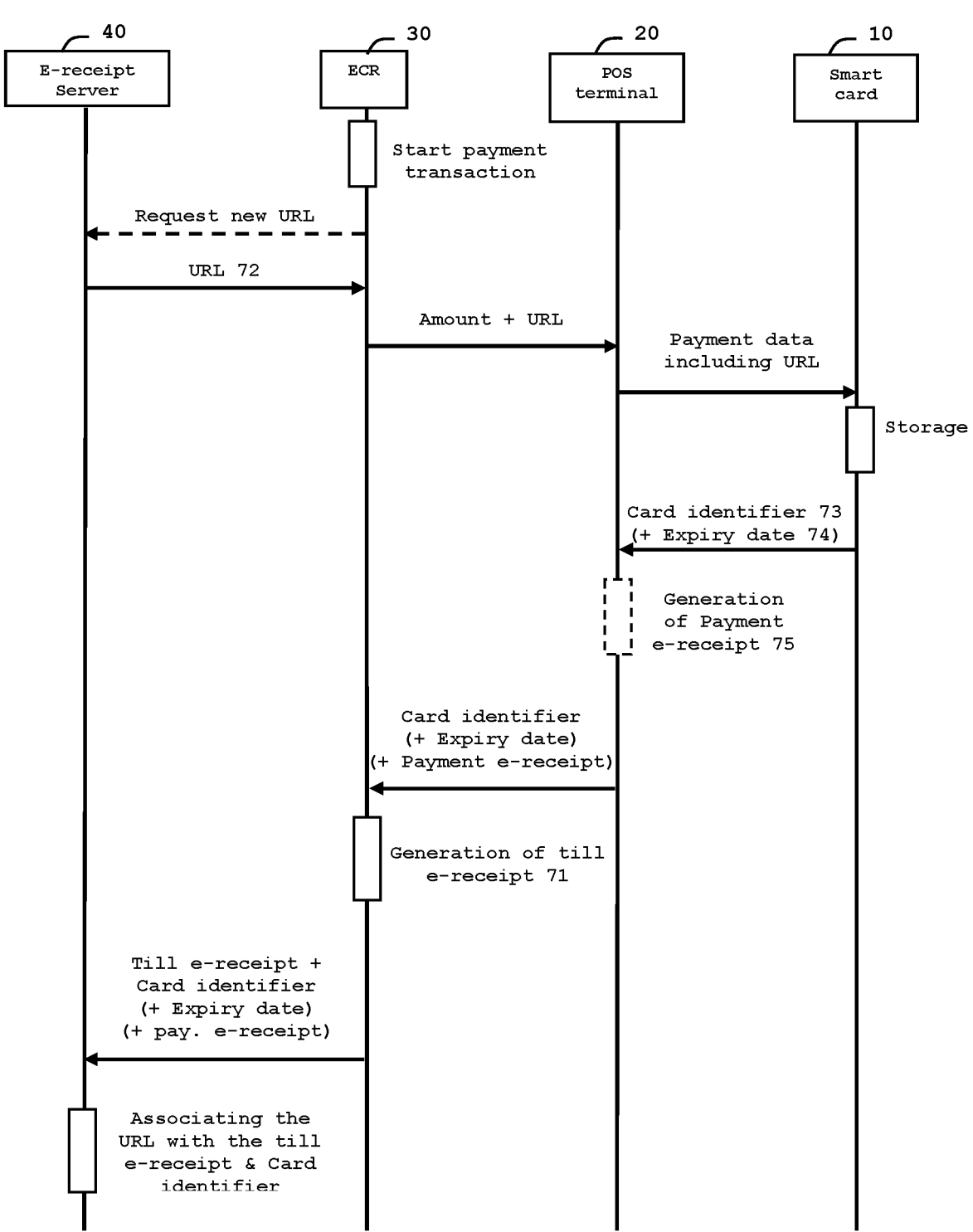
FIG. 1 shows an exemplary flow diagram for generating and recording a till e-receipt according to an example of the invention.

FIG. 1 shows an exemplary flow diagram for generating and recording a till e-receipt according to an example of the invention.

In this example, the smart card 10 is a physical banking card intended to be used by its associated user (i.e. bank customer) for payment transaction or cash withdrawal.

The bank smart card 10 embeds a secure element comprising a hardware processing unit, a memory storing an operating system and a banking application designed to contribute to payment services. The bank smart card 10 may be configured to communicate through a contact or contactless communication protocol.

After the start of a payment transaction, the Electronic Cash Register (ECR) 30 of the merchant sends a Uniform Resource Locator (URL) 72 to the smart card 10. Preferably, the smart card 10 stores the received URL.

The smart card 10 may forward the received URL 72 to another electronic device associated to the user (for instance a mobile phone or a tablet PC) in order to store the URL 72 in the other electronic device.

Preferably, the ECR may retrieve, prior to the start of the payment transaction, the URL 72 from an e-receipt server 40 (also referred to as first server) each time a payment transaction occurs by sending a message requesting a new URL to the e-receipt server 40. Alternatively, the ECR may be pre-provisioned with the URL 72 (or a plurality of URLs) provided by the e-receipt server 40.

The URL may have any appropriate structure as people skilled in the art know. For instance, the URL 72 may be: https://www.e-receiptservices.com/?receipt=lm9endk4o2m. Each till e-receipt has a unique URL.

Preferably, the ECR may communicate with the card through a POS terminal 20 and thus send the URL 72 to the smart card via the POS terminal 20. Alternatively, the ECR may directly (i.e. without intermediate device) send the URL 72 to the smart card 10.

Then the smart card sends to the Electronic Cash Register a card identifier 73 which has been permanently allocated to the smart card.

The card identifier 73 may be a Primary Account Number (PAN) as defined by ISO 7812 or a Payment Account Reference (PAR) as defined by EMVCo specifications.

It is to be noted that the card identifier 73 may be a reference assigned to a bank account associated to the card 10 or an identifier of the card itself.

Then the Electronic Cash Register generates the till e-receipt 71 corresponding to the purchased goods and sends both the card identifier 73 and the till e-receipt 71 to the e-receipt server 40.

Then the e-receipt server 40 uniquely associates the received card identifier and till e-receipt 71 to the URL 72, such that the e-receipt can be subsequently retrieved by connecting to the Uniform Resource Locator 72. In other words, the ECR is configured to send the card identifier and the till e-receipt to the e-receipt server 40 in order to trigger the provision of the till e-receipt by the e-receipt server 40 at the URL 72. It should be noted that said URL is uniquely allocated to the till e-receipt. No other till e-receipt is supposed to be associated with the URL 72 so that only the till e-receipt 71 can be retrieved from the URL 72.

The e-receipt server 40 is able to identify which URL is to be uniquely associated with both the received card identifier and till e-receipt 71. In one embodiment, the e-receipt server 40 may be configured to assign both the received card identifier and till e-receipt 71 to the last URL sent to the ECR 30. In another embodiment, the e-receipt server 40 may be configured to assign both the received card identifier and till e-receipt 71 to the URL whose reference is sent by the ECR along with the till e-receipt. Such a reference may be the URL, a hash of the URL, an index of the URL or an identifier of the ECR for instance.

In one embodiment, the ECR 30 may receive an expiry date 74 which has been permanently allocated to the smart card 10 and forward the expiry date to e-receipt server 40 with both the card identifier 73 and the till e-receipt 71. In such a case, the e-receipt server 40 may be configured to associate the received expiry date 74 to the relevant URL (E.g. URL 72 in the example described above).

The expiry date 74 may be used by the e-receipt server 40 as metadata to be checked before authorizing access to the target till e-receipt. For example, the e-receipt server 40 may check the received expiry date 74 and authorize access to the till e-receipt only if the received expiry date matches (is the same as) the stored expiry date 74 which has been associated to the till e-receipt at the time of the recording into the e-receipt server 40.

In one embodiment, the ECR 30 and the smart card 10 may communicate through a POS terminal 20. The POS terminal 20 may be configured to handle the payment transaction according to the EMV standard used in card payment schemes such as Visa®, Mastercard® or domestic cards schemes for instance. Advantageously, the conventional EMV flow of these schemes may be adapted to convey the URL from the ECR to the smart card and the card identifier (and possibly expiry date or other metadata) from the smart card to the ECR.

For instance, when the card communicates in contactless mode with the POS terminal using the PURE® white label EMV specification, the POS terminal may send the URL encapsulated in the so-called "Terminal transaction data" (Tag 9F76). The tag 9F76 value may be structured in TLV (Type-Length-Value) format to convey as many data as required. The "Terminal transaction data" may be sent to the card using either the GPO (Get Processing Options) command as defined by EMV® Integrated Circuit Card Specifications for Payment Systems, Version 4.3 or the Generate AC (Generate Application Cryptogram) command as defined by EMV® Integrated Circuit Card Specifications for Payment Systems, Version 4.3 for instance.

The ECR 30 may receive a payment e-receipt 75 generated by the POS terminal 20 for the payment transaction and send both the payment e-receipt 75 along with the till e-receipt 71 to the e-receipt server 40. The e-receipt server 40 may be configured to make the payment e-receipt 75 accessible at the URL 72 which is assigned to the till e-receipt 71.

In the above-presented examples, the smart card 10 is a physical banking card. Alternatively, the smart card 10 may be a digital card hosted in a portable electronic device like a smartphone, a tablet PC or a PDA. The previously presented embodiments may apply to the digital card with two specific features: the card identifier 73 may be a PAR or a Token as specified by EMVCo specifications. (For example EMV® Payment Tokenisation Specification-Technical Framework v2.2) and the communication messages between the ECR (or the POS terminal) and the digital card are conveyed through the relevant communication interface of the hosting portable electronic device.

The e-receipt server 40 may be operated by the merchant, the merchant's acquiring bank or any third party that provides relevant digitization services to the merchant.

Figures 3, 4:
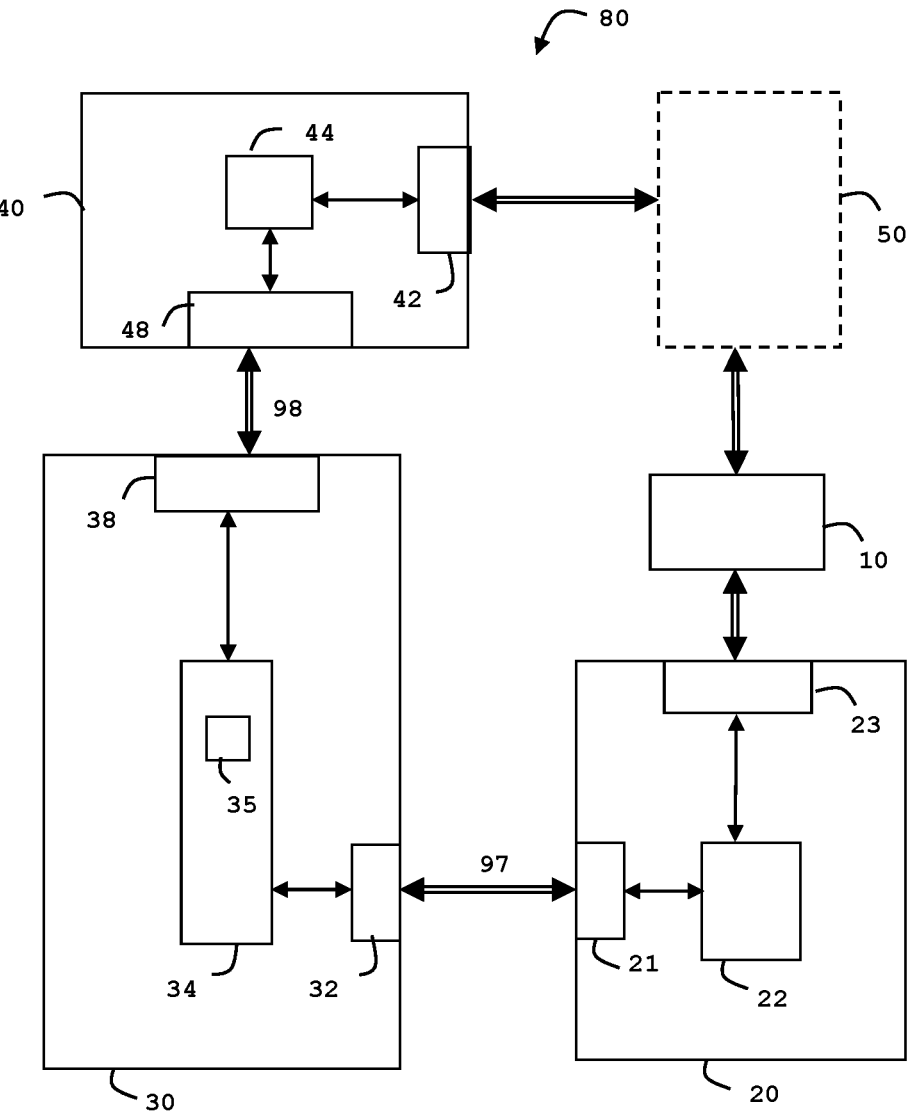
FIG. 3 shows a container for storing URLs linked to till e-receipts according to an example of the invention.
FIG. 4 shows a diagram of architecture of a system for managing a till e-receipt according to an example of the invention.

FIG. 3 shows a container 90 for storing URLs linked to till e-receipts generated according to an example of the invention.

The container 90 may be comprised in the smart card 10. The container 90 may be implemented as a file or a database for instance.

The container 90 may be a cyclic file comprising a predefined number of records. When the maximum capacity of a cyclical file is reached (I.e. no remaining empty record), the newest entry is written over the oldest entry.

In the example of FIG. 3, the container 90 comprises four records 91 to 94 and stores three URLs (URL1, URL2, URL3) generated according to the invention.

Each record may comprise three fields: the date of the payment transaction, the merchant from whom goods were bought and the URL allowing to retrieve the till e-receipt of the payment transaction from the e-receipt server 40. In a variant, each record may also comprise the amount of the payment transaction. In a variant, records may be devoid of the date or the name of the merchant.

It is to be noted that the container 90 may contain URLs pointing to more than one e-receipt server.

Access to the content of the container 90 may be controlled by the card 10 (using specific access conditions) to ensure that only the cardholder (I.e. the genuine user of the card 10) can access the till e-receipts.

Figure 2:
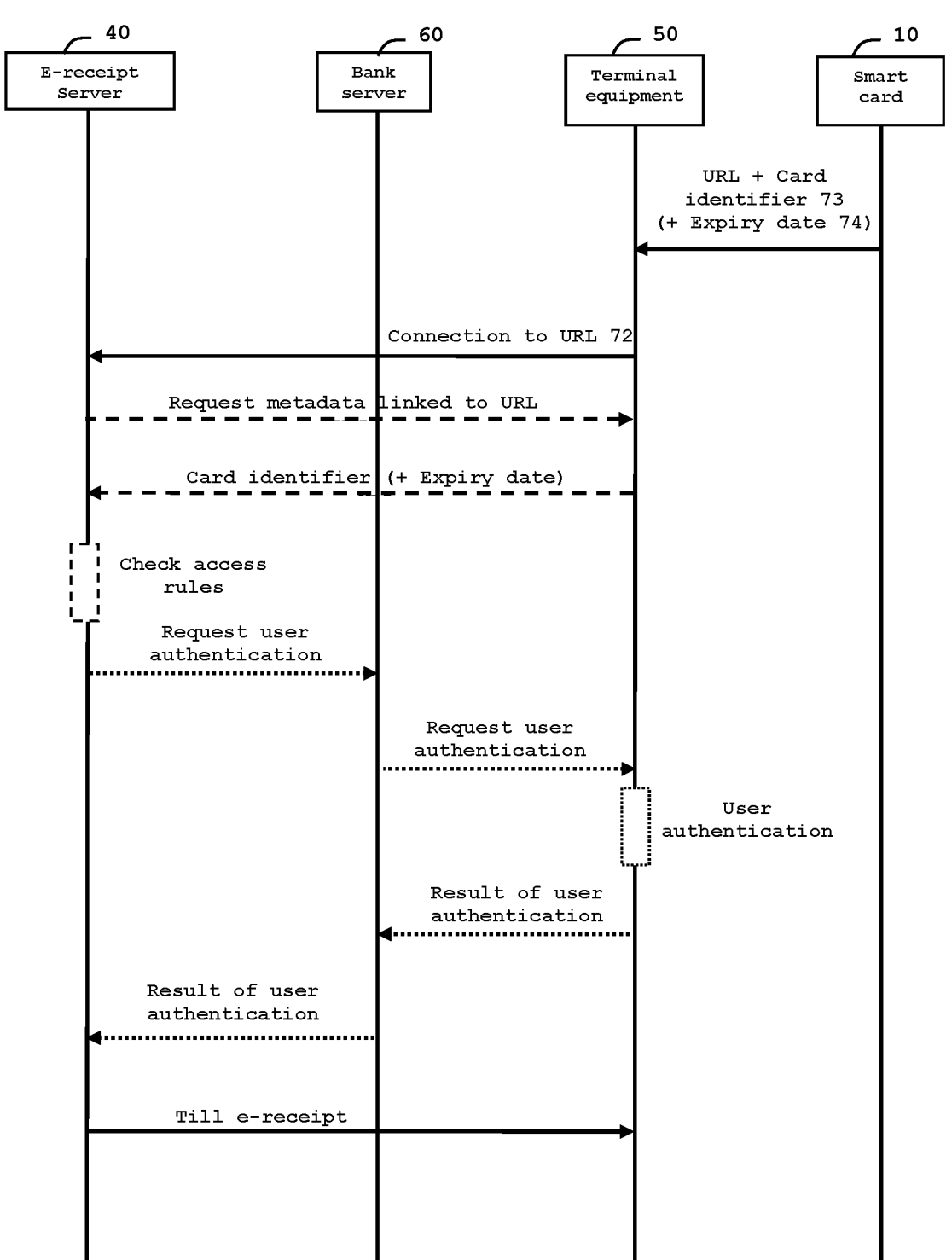
FIG. 2 shows an exemplary flow diagram for accessing a recorded till e-receipt according to an example of the invention.

FIG. 2 shows an exemplary flow diagram for accessing a recorded till e-receipt according to an example of the invention.

In this example, the smart card 10 is a physical banking card and the till e-receipt is assumed to have been stored in the e-receipt server 40.

At a first step, the smart card 10 provides a terminal equipment 50 with the URL associated with the target till e-receipt. By reference to the examples of FIG. 1, the card 10 may provide the URL 72 which corresponds to the till e-receipt 71. The terminal equipment 50 may be a portable electronic device like a mobile phone or tablet PC for instance. The card may have been securely paired to the terminal equipment 50 in order to increase the security. The card 10 and the terminal equipment 50 may communicate through a contactless protocol relying on Near-Field-Communication (NFC) or Bluetooth Low Energy (BLE) technology. Alternatively, the card 10 and the terminal equipment 50 may communicate through a contact protocol provided that the terminal equipment 50 includes a card reader or can be connected to a card reader.

The terminal equipment 50 comprises an application which is configured to get an URL (and possible associated metadata like the card identifier and an expiry date) from the smart card 10. The application is also configured to connect the e-receipt server 40 and to provide the user with the retrieved till e-receipt.

Then the terminal equipment 50 connects to the e-receipt server 40 at the received URL.

In one embodiment, the access to the data accessible at the URL may be free. Thus the terminal equipment 50 may retrieve the till e-receipt from the e-receipt server 40 and provide the card user with the retrieved data. The till e-receipt may be displayed or provided to the user in an audio way.

When available, the corresponding payment receipt may be transmitted with the till e-receipt from the e-receipt server 40 to the terminal equipment 50.

Preferably, the e-receipt server 40 is configured to check access rule(s) in order to ensure the confidentiality of the e-receipt data and deny unwanted attempts to retrieve a till e-receipt. To this end, the card may be configured to provide the terminal equipment 50 with the card identifier 73 which is associated to the URL 72. In response to the connection to the URL 72 (by the terminal equipment 50), the e-receipt server 40 may send to the terminal equipment 50 a request to get metadata linked to the URL 72. The terminal equipment 50 may return to the e-receipt server 40 the card identifier 73 received from the card 10. Then the e-receipt server 40 may check that the received card identifier 73 is the same as the card identifier it stores and which has been previously associated to the URL during the flow of FIG. 1. In case of unsuccessful checking, the e-receipt server 40 may deny access to the till e-receipt. In case of successful checking, the terminal equipment 50 may be authorized to get the corresponding till e-receipt from the e-receipt server 40.

Similarly, the expiry date of the smart card may be used for an additional metadata check before authorizing access to the till e-receipt. In such a case, the smart card provides the terminal equipment with the expiry date 74 which in turn send the expiry date 74 to the e-receipt server 40. Then the e-receipt server 40 may check that the received expiry date 74 matches with an expiry date (supposed to have been initially stored in association with the till e-receipt by the server 40) associated with the till e-receipt corresponding to the target URL.

In another secure embodiment, a different check can be performed in addition to (or instead of) the previous check(s).

In another secure embodiment, another check can be performed in addition to (or instead of) the previous check (s). During a risk assessment step performed by the e-receipt server 40, the e-receipt server 40 may send to a bank server 60 a request to authenticate the user. In turn the bank server 60 may send a request for user authentication to the terminal equipment 50. It is to be noted that the e-receipt server 40 may provide the bank server 60 with the card identifier 73 associated with the till e-receipt so that the bank server 60 can identify the user account and associated data. Thus the bank server may identify the terminal equipment 50 (or phone number) of the e genuine user. The user equipment 50 may authenticate the user through a PIN code or a biometric data and send back the result to the e-receipt server 40 via the bank server 60 (or directly).

In a variant, the e-receipt server 40 and the bank server 60 may rely on the 3-D Secure protocol for authenticating the user of the terminal equipment 50.

The metadata used to control access to the till e-receipt may also contain the location of the terminal equipment (to restrict access from a terminal equipment located in a specific country for instance) or a fingerprint of the terminal equipment assumed to have been previously used to access the e-receipt server 40.

In other examples, the smart card 10 may be a digital banking card hosted by the terminal equipment 50. The digital smart card 10 sends the URL associated with the target till e-receipt (and possibly additional metadata) to an application hosted in the terminal equipment 50. The rest of the flow is similar to any of the plurality of ones described below.

FIG. 4 shows an example of diagram of architecture of a system 80 for managing till e-receipts according to the invention.

The system 80 comprises an Electronic Cash Register (ECR) 30, a POS terminal 20, a smart card 10 and an e-receipt server 40.

The ECR 30 is designed to generate a till e-receipt associated to a payment transaction involving a smart card. The ECR comprises a first communication interface 32 for connecting a POS terminal and a second communication interface 38 for connecting the e-receipt server 40. The ECR comprises an e-receipt manager 34 which may be implemented as a software application, a hardware component or a combination of both.

The e-receipt manager 34 may store (or have access to) a keyset 35 comprising key(s) allowing to establish a secure communication channel 98 with the POS terminal 20 or a secure communication channel 97 with the e-receipt server 40.

The e-receipt manager 34 is configured to get a URL from the e-receipt server 40 and to send this URL to the smart card (directly or via the POS terminal 20). The e-receipt manager 34 is configured to generate and send the till e-receipt to the e-receipt server 40 to trigger the provision of the till e-receipt by the e-receipt server at the Uniform Resource Locator. This Uniform Resource Locator is assumed to be uniquely allocated to the till e-receipt.

The e-receipt manager 34 may be configured to receive a payment e-receipt and/or metadata like a card identifier 73 or an expiry date 74 which have been permanently allocated to the smart card and to send them to the e-receipt server 40 along with the till e-receipt.

The e-receipt server 40 comprises a communication interface 48 for connecting the ECR 30 and a communication interface 42 for connecting the terminal equipment 50 of the card user or a bank server. The communication interfaces 42 and 48 may be merged in a single one.

The e-receipt server 40 comprises a till manager 44 which is configured to select an URL, to send the selected URL to the ECR 30, to receive a till e-receipt (and possibly corresponding metadata) and to associate the received till e-receipt (and possibly corresponding metadata and payment e-receipt) to the selected URL.

The till manager 44 may be configured to generate URL when needed or to access a set of pre-generated URLs. The till manager 44 is configured to make the till e-receipt accessible at the associated Uniform Resource Locator. The till manager 44 is configured to allocate a unique URL to each managed till e-receipt.

The e-receipt server 40 may be implemented as a software entity hosted on a hardware computer including at least a processor and a memory. The e-receipt server 40 may be implemented as a hardware computer including firmware or applicative software.

The smart card 10 may be configured to store a set of URLs allocated to as many till e-receipts and to provide the set of stored URLs to a terminal equipment 50.

The smart card 10 may be configured to send the card identifier 73 (and expiry date 74) to the POS terminal during the usual data exchanges with the POS terminal.

The invention is not limited to the described embodiments or examples. In particular, the described examples and embodiments may be combined.

The invention is not limited to Banking smart cards and applies to any smart cards able to participate to a payment transaction.

Thanks to some embodiments of the invention, the ECR may save time by automatically sending the appropriate URL to the smart card, without additional action of the cardholder compared to conventional payment transactions. In particular, the cardholder may be exempted from providing their personal data like email or phone number (which may take times and slow down the payment operation at the merchant shop). Thus, the payment transaction processing can be hastened for better user experience.

Thanks to some embodiments of the invention, the till e-receipt may be made available (at the associated URL) immediately to the user. Thus the cardholder may consult the content of the till e-receipt without delay.

It is to be noted that the invention may apply to any hardware smart cards having a form factor different from a conventional smart card. For example, the invention may apply to wearable devices like a bracelet or a ring.

The invention claimed is:

1. A method for managing a till e-receipt during a payment transaction involving an Electronic Cash Register and a smart card, wherein the method comprises the steps:

Sending a Uniform Resource Locator from an e-receipt server to the Electronic Cash Register, then Sending from the smart card to the Electronic Cash Register a card identifier which has been permanently allocated to the smart card, Sending the Uniform Resource Locator from the Electronic Cash Register to the smart card and storing the Uniform Resource Locator into the smart card, then Generating the till e-receipt by the e-receipt server;

Sending the card identifier and the till e-receipt from the Electronic Cash Register to the e-receipt server, and After receiving the card identifier and the till e-receipt, identifying by the e-receipt server, from among a plurality of Uniform Resource Locators predefined in the e-receipt server, the Uniform Resource Locator which has been sent by the ECR to the smart card for the payment transaction, then Uniquely associating, by the e-receipt server, said card identifier and till e-receipt to the Uniform Resource Locator, such that the e-receipt can be subsequently retrieved by connecting to the Uniform Resource Locator.

2. The method according to claim 1, wherein the e-receipt server may send more than one Uniform Resource Locator and wherein the e-receipt server identifies the last Uniform Resource Locator sent to the Electronic Cash Register as the Uniform Resource Locator to be associated to both the received card identifier and the till e-receipt.

3. The method according to claim 1, wherein the Electronic Cash Register sends to the e-receipt server a reference of the URL along with said card identifier and wherein the e-receipt server uses said reference to identify the Uniform Resource Locator to be associated to both the received card identifier and till e-receipt.

4. The method according to claim 1, wherein the smart card is a physical card and the card identifier is a Primary Account Number or wherein the smart card is a digital card hosted in a terminal equipment and the card identifier is a Token or wherein the smart card is either a physical card or a digital card hosted in a terminal equipment and the card identifier is a Payment Account Reference.

5. The method according to claim 1, wherein the Electronic Cash Register sends the Uniform Resource Locator to the smart card through a POS terminal and receives the card identifier from the POS terminal, and wherein the POS terminal sends the Uniform Resource Locator encapsulated in a Terminal transaction data using a Get Processing Options command or a Generate Application Cryptogram.

6. The method according to claim 1, wherein the smart card sends to a terminal equipment said Uniform Resource Locator and wherein the terminal equipment retrieves the till e-receipt from the e-receipt server by using the Uniform Resource Locator.

7. The method according to claim 6, wherein the smart card sends to the terminal equipment the card identifier, wherein responsive to a connection to the Uniform Resource Locator by the terminal equipment, the e-receipt server sends to the terminal equipment a request to get metadata linked to the Uniform Resource Locator, wherein the terminal equipment returns the card identifier to the e-receipt server, wherein the e-receipt server checks that the received card identifier is the same as the card identifier previously associated with the Uniform Resource Locator by the e-receipt server and wherein the e-receipt server denies access to the till e-receipt in case of unsuccessful checking and authorize the terminal equipment to get the till e-receipt in case of successful checking.

8. The method according to claim 6, wherein the Electronic Cash Register receives an expiry date permanently allocated to the smart card, wherein the Electronic Cash Register sends the expiry date to said e-receipt server which associate said expiry date to the Uniform Resource Locator, wherein the smart card sends the expiry date to the terminal equipment, wherein responsive to a connection to the Uniform Resource Locator by the terminal equipment, the e-receipt server sends to the terminal equipment a request to get metadata linked to the Uniform Resource Locator, wherein the terminal equipment returns the expiry date to the e-receipt server, wherein the e-receipt server checks that the received expiry date is the same as the expiry date previously associated with the Uniform Resource Locator by the e-receipt server and wherein the e-receipt server denies access to the till e-receipt in case of unsuccessful checking and authorize the terminal equipment to get the till e-receipt in case of successful checking.

9. The method according to claim 6, responsive to a connection to the Uniform Resource Locator by the terminal equipment, the e-receipt server sends to a bank server a request to authenticate a user of the smart card, wherein in turn the bank server sends a request for user authentication to the terminal equipment, wherein the terminal equipment try to authenticate the user through a PIN code or a biometric data and sends back the result to the e-receipt server via the bank server and wherein the e-receipt server denies access to the till e-receipt in case of unsuccessful user authentication and authorize the terminal equipment to get the till e-receipt in case of successful user authentication.

10. A system for managing a till e-receipt during a payment transaction involving an Electronic Cash Register and a smart card, said system comprising the Electronic Cash Register, the smart card and an e-receipt server;

wherein the e-receipt server is configured to send a Uniform Resource Locator to the Electronic Cash Register; then the smart card is configured to send to the Electronic Cash Register a card identifier which has been permanently allocated to the smart card;

the Electronic Cash Register is configured to send the Uniform Resource Locator to the smart card and the smart card is configured to store the Uniform Resource Locator, then the e-receipt server is configured to generate the till e-receipt;

the Electronic Cash Register is configured to send the card identifier and the till e-receipt from to the e-receipt server;

after receiving the card identifier and the till e-receipt, the e-receipt server is configured to identify from among a plurality of Uniform Resource Locators predefined in the e-receipt server, the Uniform Resource Locator which has been sent by the ECR to the smart card for the payment transaction; then the e-receipt server is configured to uniquely associate, said card identifier and till e-receipt to the Uniform Resource Locator, such that the e-receipt can be subsequently retrieved by connecting to the Uniform Resource Locator.

11. The system according to claim 10 is communicatively coupled to a smart card and a POS terminal, wherein the Electronic Cash Register is configured to send the Uniform Resource Locator to the smart card through the POS terminal and to receive the card identifier from the POS terminal.

12. The system according to claim 10 comprises a terminal equipment configured to get an URL from the smart card, to retrieve the till e-receipt from the e-receipt server at the Uniform Resource Locator and to provide a user of the smart card with said till e-receipt.

13. The system according to claim 10, wherein said smart card is a physical card.

14. The system according to claim 10, wherein said smart card is a digital card.

* * * * *